United States Patent
Juhas et al.

(10) Patent No.: US 10,494,055 B2
(45) Date of Patent: Dec. 3, 2019

(54) CYCLE SHIFTER SYSTEM WITH INTEGRATED SENSOR

(71) Applicant: GM GLOBAL TECHNOLOGY OPERATIONS LLC, Detroit, MI (US)

(72) Inventors: Martin Juhas, Ottawa (CA); Andje U. Lewkowicz-Lalonde, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 158 days.

(21) Appl. No.: 15/918,010

(22) Filed: Mar. 12, 2018

(65) Prior Publication Data
US 2019/0276115 A1  Sep. 12, 2019

(51) Int. Cl.
| | |
|---|---|
| B62M 6/50 | (2010.01) |
| B62M 9/122 | (2010.01) |
| B62M 25/04 | (2006.01) |
| B62M 11/14 | (2006.01) |

(52) U.S. Cl.
CPC ............. *B62M 6/50* (2013.01); *B62M 9/122* (2013.01); *B62M 11/14* (2013.01); *B62M 25/04* (2013.01)

(58) Field of Classification Search
CPC .......... B62M 6/50; B62M 9/22; B62M 11/14; B62M 25/04
USPC ....................................... 180/206.3
See application file for complete search history.

(56) References Cited

U.S. PATENT DOCUMENTS

| | | | |
|---|---|---|---|
| 9,950,767 B2 * | 4/2018 | Ichida | B62M 6/45 |
| 2014/0235383 A1 * | 8/2014 | Wesling | F16H 9/06 474/80 |
| 2018/0257743 A1 * | 9/2018 | Tsuchizawa | B62M 25/08 |

* cited by examiner

*Primary Examiner* — Tony H Winner
*Assistant Examiner* — Felicia L. Brittman
(74) *Attorney, Agent, or Firm* — Lorenz & Kopf, LLP

(57) ABSTRACT

A system is provided for shifting gears in a cycle. The shifter system includes a motor that delivers a torque to propel the cycle. A variable ratio transmission is coupled with the motor. A cable transmits movement to shift the variable ratio transmission. A cable pulley is connected with the cable and is rotated to move the cable. A lever is coupled with the cable pulley and imparts rotation to the cable pulley. A sensor is positioned to detect an initial input on the lever that does not rotate the cable pulley. A controller interrupts the torque from the motor in response to the initial input and prior to a shift in response to the transmission of movement by the cable.

20 Claims, 5 Drawing Sheets

CYCLE SHIFTER SYSTEM WITH INTEGRATED SENSOR

TECHNICAL FIELD

The present disclosure generally relates to cycles, and more particularly relates to shifters for electric bicycles.

BACKGROUND

Bicycles often include actuators in the form of shifters through which the rider provides inputs to shift gears, to apply brakes, or to carry out other operations. For example, multiple gears are often provided for changing the gear ratio between the bicycle's power source and its drive wheel. Power sources include manual inputs through pedal and crank mechanisms, motor drives, or a combination of both. Typically, gear changes are initiated by manual shift inputs to the shifter that are communicated to a variable ratio transmission system which often includes a Derailleur mechanism, an internally geared hub or a combination of both, or a continuously variable gear mechanism, or other mechanism capable of changing gear ratios. The shift inputs are communicated to the transmission system through a linkage, such as a cable. Sensing a shift event typically involves monitoring for motion of the cable. Motion of the cable indicates that a shift event is already underway, and therefore, sensing occurs too late to carry out functions in anticipation of the shift. In addition, cable sensors tend to create undesirable drag on the cable.

Accordingly, it is desirable to provide improved shift sensing in bicycles, and shifter systems that provide the same. Other desirable features and characteristics of the present invention will become apparent from the subsequent detailed description and the appended claims, taken in conjunction with the accompanying drawings and the foregoing technical field and background.

SUMMARY

In a number of embodiments, a shifter system for a cycle includes a power unit configured to deliver a torque to propel the cycle. A variable ratio transmission system coupled with the power unit. A coupling element transmits movement to shift the variable ratio transmission. A pulley is coupled with the coupling element and rotates to move the coupling element. A lever is coupled with the pulley and imparts rotation to the pulley. A sensor is positioned to detect an initial input on the lever. The initial input is detected by the sensor but does not rotate the pulley. A controller interrupts the torque from the power unit in response to the initial input and prior to the transmission of movement by the coupling element.

In additional embodiments, a lash mechanism offsets the initial movement of the lever in response to the initial input as the pulley remains stationary. Further movement of the lever beyond the initial movement moves the pulley to shift the variable ratio transmission system through the coupling element.

In additional embodiments, the lash mechanism includes a pin. The pulley defines an aperture into which the pin extends and the pin moves in the aperture in response to the initial movement.

In additional embodiments, the lever includes at least two sections. The hinge connects the sections. The sensor is positioned on the lever to detect rotation of one section about the hinge.

In additional embodiments, the sections define a space. A spring is positioned in the space between the first and second sections and is compressed in response to the initial input.

In additional embodiments, the spring has a spring rate so that the inboard section does not move when the spring is compressed in response to the initial input.

In additional embodiments, an arm is positioned adjacent the pulley, and the pulley is coupled with the coupling element through the arm. The arm defines an aperture and a pin extends from the pulley and into the aperture. The pin and aperture provide lash between the lever and the coupling element so that the initial input does not move the coupling element.

In additional embodiments, the coupling element is connected to the arm.

In additional embodiments, a housing houses the pulley and the arm. The sensor detects movement between the lever and the housing.

In a number of other embodiments, a shifter system for a cycle includes a motor that delivers a torque. A variable ratio transmission system receives the torque and is operable to shift between various gear ratios. A shifter triggers the variable ratio transmission system to shift. A cable extends from the shifter to the variable ratio transmission system, and moves in response to the shifter, to shift the variable ratio transmission system. The lever is connected in the shifter to move the cable in response to a shift input. A sensor detects an initial input on the lever. The initial input is insufficient to move the cable. A controller operates to interrupt the torque from the motor in response to the initial input and prior to movement of the cable.

In additional embodiments, a cable pulley is disposed in the shifter and is connected with the cable to move the cable in response to the shift input. A lash mechanism is configured so that an initial movement of the lever in response to the initial input does not rotate the cable pulley and so that further movement of the lever beyond the initial movement and in response to the shift input moves the cable pulley to shift the variable ratio transmission system through the cable.

In additional embodiments, the lash mechanism includes a pin, and the cable pulley defines an aperture into which the pin extends so that the pin moves in the aperture in response to the initial movement.

In additional embodiments, the lever includes two sections. A hinge connects the two sections and the sensor is positioned on the lever to detect rotation of the second section about the hinge.

In additional embodiments, the two sections define a space. A spring is positioned in the space and between the first and second sections. The spring is compressed in response to the initial input.

In additional embodiments, the spring has a spring rate configured so that the section at the shifter does not move when the spring is compressed in response to the initial input.

In additional embodiments, a cable pulley is disposed in the shifter and is connected with the cable. An arm is disposed in the shifter and defines an aperture. A pin extends from the cable pulley and into the aperture. The pin and the aperture provide lash between the lever and the cable so that the initial input does not move the cable.

In additional embodiments, another lever is connected in the shifter to move the cable. Another sensor is configured to detect an input on the additional lever. The controller interrupts the torque from the motor in response to the input on the second lever.

In additional embodiments, a crankshaft is coupled with the variable ratio transmission system. The crankshaft responds to manual pedal inputs to propel the cycle.

In additional embodiments, the lever has a grip configured to twist to provide the initial input and the shift input.

In a number of other embodiments, a shifter system for a cycle includes a propulsion system with a motor configured to deliver a torque to propel the cycle and a variable ratio transmission system coupled with the motor. A crankshaft with pedals is connected in the propulsion system to propel the cycle by manual inputs on the pedals. A shifter is disposed on the cycle. A cable connects the shifter with the variable ratio transmission system to transmit movement from the shifter to initiate a shift of the variable ratio transmission system. A cable pulley is disposed in the shifter and is coupled with the cable to rotate to move the cable. A lever is connected in the shifter, is coupled with the cable pulley, and is configured to impart rotation to the cable pulley. A sensor is positioned to detect an initial movement of the lever. The initial movement is detectable by the sensor but does not rotate the cable pulley. A controller interrupts the torque from the motor in response to the initial movement and prior to the shift.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In one or more exemplary embodiments related to powered bicycles and as described herein, a shifter system generally includes the interruption of torque inputs in response to an initial shift input and prior to initiating an actual shift. Relieving torque in anticipation of a shift provides smoother shifts without binds, improves the riding experience, and reduces wear on driveline components. Sensing is integrated into the shifter, providing optimal performance and feel with compact packaging.

Figure 1:
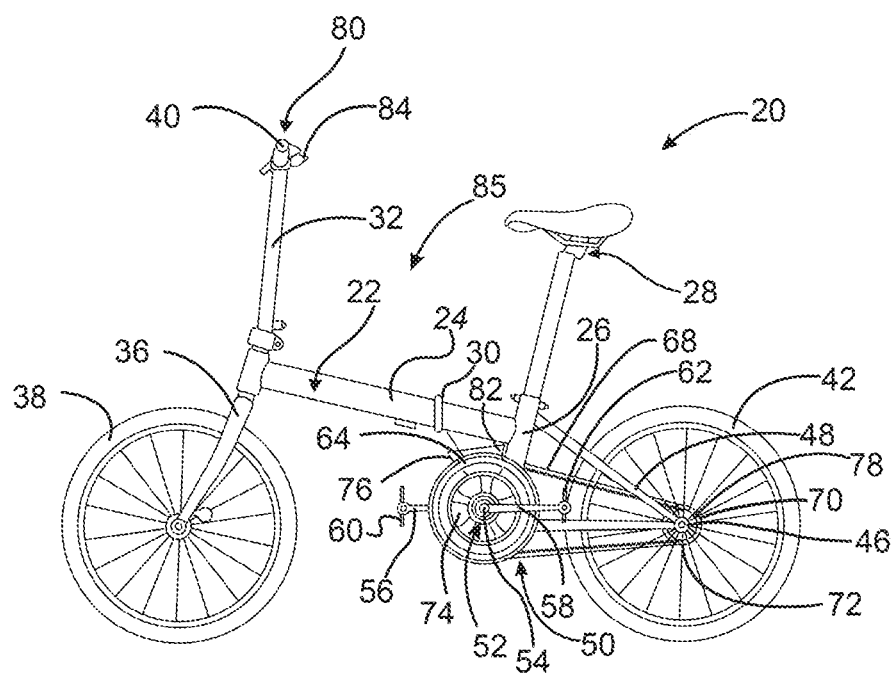
FIG. 1 is a side elevation view of a bicycle in accordance with various embodiments.

Referring to FIG. 1, an example cycle is illustrated in the form of a cycle 20, which in this embodiment includes electric propulsion assist along with manual pedal input propulsion. In other embodiments, the cycle 20 is propelled by other types of powered input, such as an internal combustion or other engine type. In additional embodiments, the cycle 20 is propelled solely by rider pedal inputs, or solely by electric/engine or another propulsion type. In some embodiments, multiple power sources of the same or different types may be included. In this example the cycle 20 is a bicycle configured is a compact form and is designed to carry a single rider for transportation. In other embodiments, the cycle 20 is configured differently, such as with additional structural, seating, cargo carrying, or other elements.

The cycle 20 includes a frame 22 which has interconnected structural elements providing support for the components of the cycle 20 and the intended rider. The frame 22 includes a main tube 24 as the primary structural element that extends generally in a horizontal direction connecting the front and rear parts of the cycle 20. In other embodiments, the cycle 20 includes multiple tubes such as a top tube and a down tube to connect the front and rear parts of the cycle 20. In the current embodiment, the main tube 24 is connected with a seat tube 26 that supports a seat assembly 28 and that serves as a connection between various parts of the cycle 20. In this embodiment, the main tube 24 includes a hinged joint 30 to enable folding the frame 22, so that the cycle 20 is reconfigurable into a compact form facilitating carrying and storage. A steering tube 32 is connected with, and extends upward from, the main tube 24. The steering tube 32 is operatively connected with a front fork 36, which is attached to a front wheel 38. Handlebars 40 are attached to the steering tube 32 for use in controlling the direction of the front wheel 38 by way of the front fork 36 for steering the cycle 20.

In addition to the front wheel 38, the cycle 20 includes a rear wheel 42 supported by a pair of chain stays 44, one of which extends on each side of the rear wheel 42 to an axle bracket 46. A pair of seat stays 48 extend between the axle bracket 46 and the seat tube 26, one extending on each side of the rear wheel 42. The chain stays 44 and the seat stays 48 support the seat assembly 28 and maintain separation of the rear wheel 42 from a propulsion system 50. The cycle 20 includes two wheels 38, 42 and in this embodiment, is a bicycle. In other embodiments, the cycle 20 includes any number of wheels, such as three, four, or another number of wheels.

The propulsion system 50 includes a crank assembly 52 which includes a crankshaft 54 connected with a right pedal assembly 56 and with a left pedal assembly 58. The right pedal assembly 56 includes a right foot pedal 60, and the left pedal assembly 58 includes a left foot pedal 62. A linked element, in this embodiment in the form of a sprocket 64, operatively connects the propulsion system 50 including the crankshaft 54 to a linking member in the form of a chain 68. In other embodiments, the linked element is a pulley or another similar device and the linking member is a belt or another link suitable for engaging the linked element with the rear wheel 42 for propelling the cycle 20. The chain 68 is operatively connected to a hub 70 of the rear wheel 42 at another sprocket 72. Through the sprocket 64, the chain 68, the sprocket 72 and the hub 70, the propulsion system 50 drives the rear wheel to rotate as a drive wheel in response to manual and/or powered torque inputs. In some embodiments, human/motor/engine braking is included where the rear wheel 42 drives the pedals/motor/engine. The propulsion system 50 includes a power unit 74, which in this embodiment includes an electric motor 76, for propelling the cycle 20 on its own or for assisting rider provided inputs through the crank assembly 52. It should be understood that other types of power units are contemplated within the scope of this disclosure. For example, some embodiments include multiple electric motors providing power assisted motoring, for example at the front and rear wheels 38, 42, or at one or more of the wheels 38, 42 and a mid-drive. Power sources may include internal combustion, fuel cells, and/or others.

The propulsion system 50 includes a variable ratio transmission system 78 connected to receive inputs form the motor 76 and the crankshaft 54. In the current embodiment, the variable ratio transmission system 78 is provided as a part of the hub 70 and as part of the propulsion system 50, each of which include gearing. In other embodiments, the rear wheel includes a Derailleur type mechanism rather than the geared hub 70. In some embodiments, the variable ratio transmission system 78 is provided solely in the propulsion system 50 or solely in the hub 70, rather than in both. The variable ratio transmission system 78 includes internal gears such as epicyclic gears, sealed within the hub 70 and/or in the propulsion system 50. In other embodiments, the variable ratio transmission system 78 includes multiple sprockets of different sizes with a mechanism to move the chain 68 from one sprocket to another to provide different gear ratios between the propulsion system 50 and the rear wheel 42. In some embodiments, a variable gear system based on varying geometry of engaged elements such as a variator or similar device is used.

Control devices 80 including a shifter 84 are provided, such as on the handlebars 40, and are constructed and arranged to communicate with one or more controlled devices, and/or with the motor 76 of the propulsion system 50. The one or more controlled devices include mechanical devices such as gears in the hub 70 or brakes (not shown). The shifter 84 is a part of a shifter system 85 for the cycle 20. The control devices 80, including the shifter 84, communicate with the one or more controlled devices, including the propulsion system 50 and the hub 70, through an embedded system with at least one controller 82 for receiving input signals and sending output signals to control various components of the cycle 20, which includes sending output signals to control operation of the motor 76 contained in the power unit 74. In a number of embodiments, controller 82 includes a processor, memory, other hardware and software to process the input signals and to generate the output signals, and uses formulas, lookup tables or other means for comparing and processing data. In the current embodiment, the controller 82 includes power electronics including an inverter that changes direct current from a battery to alternating current for use by the motor 76. During operation of the cycle 20 in an electric drive mode, the propulsion system 50 is controlled to interrupt torque input from the motor 76 during a gear change. This reduces wear on the variable ratio transmission system 78 and provides a smoother shift experience for the mechanisms and the rider.

Figure 2:
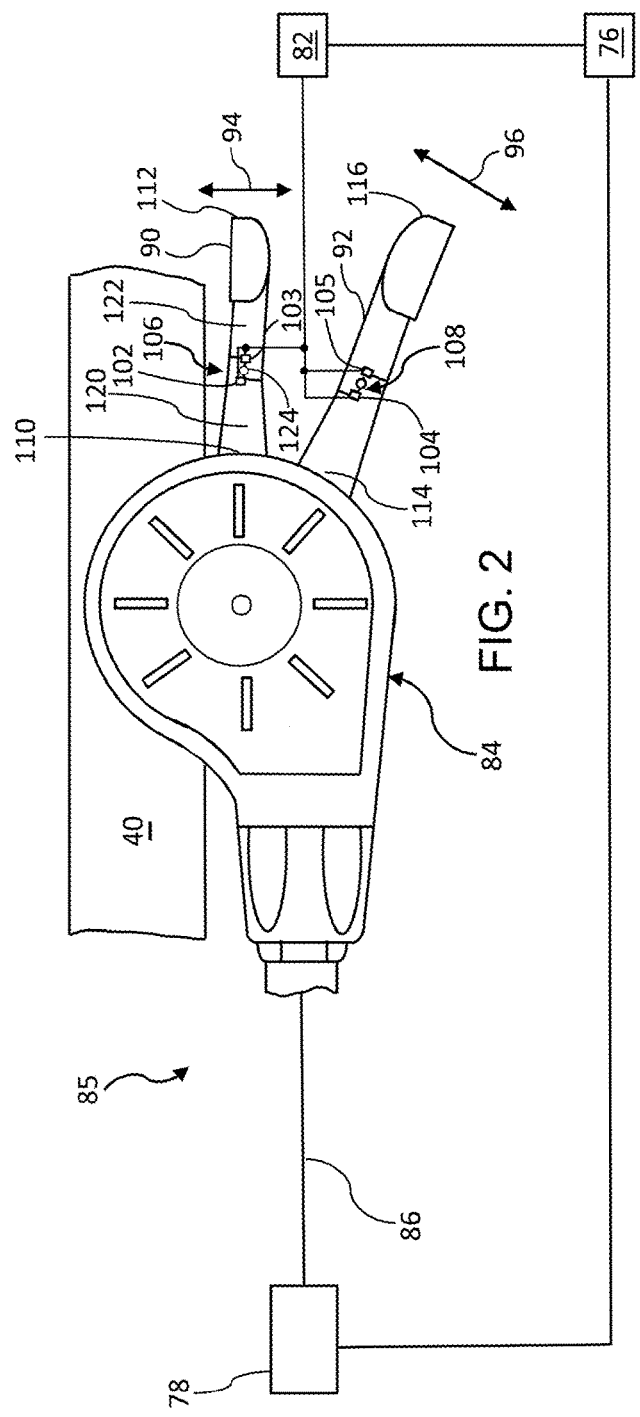
FIG. 2 is a schematic illustration of a shifter system for use with the bicycle of FIG. 1, in accordance with various embodiments.

Referring to FIG. 2, the shifter 84 of the shifter system 85 is mounted on the handlebars 40 and is configured to provide rider inputs to the variable ratio transmission system 78 via a coupling element, in this embodiment cable 86. In other embodiments, the shifter 84 provides inputs to the variable ratio transmission system 78 through other mechanical means, electrically, or through another communicative coupling type as the coupling element. The shifter 84 includes a body 88 that receives the cable 86 and supports a pair of levers including an upshift lever 90 and a downshift lever 92. The levers 90, 92 are positioned near the handlebars 40 and are arranged for convenient index finger inputs 94 to effect upshifts and thumb inputs 96 to effect downshifts. For example, an input 94 pivots the lever 90 in either direction in this embodiment, moving the cable 86, which communicates that movement to the variable ratio transmission system 78 to shift up one gear step (e.g. $4^{th}$ gear to $5^{th}$ gear). Also for example, an input 96 pivots the lever 92 in either direction in this embodiment, moving the cable 86, which communicates that movement to the variable ratio transmission system 78 to shift down one gear step (e.g. $12^{th}$ gear to $11^{th}$ gear). Multiple gear steps are achieved through multiple inputs 94 or 96 to the levers 90, 92, respectively. In some embodiments, shifting through multiple gears with one 1 actuation of lever 96 to shift through 1, 2, or 3 gears for one thumb sweep/actuation. In this embodiment, the lever 92 is actuated in either direction, for example using either a thumb or an index finger to provide the rotating force. In other embodiments the input 94 is limited to one direction.

As noted above, when the variable ratio transmission system 78 is commanded to shift between gears by movement of the cable 86, torque applied to the chain 68 is relieved by interrupting torque output from the motor 76. Torque output is interrupted by turning off the supply of current to the motor 76. In other embodiments, torque output is interrupted by opening a clutch (not shown), coupled between the motor 76 and the sprocket 64, or by other means. In the current embodiment, the torque is interrupted in anticipation of a gear shift before the cable 86 moves and before the variable ratio transmission system 78 begins the process of shifting gears. To anticipate a gear shift, sensors 102, 103 are disposed on the lever 90, and sensors 104, 105 are disposed on the lever 92. In general, the sensors 102-105 are capable of detecting relative movement. In the current embodiment, the sensors 102-105 are contact sensors, such as those that include buttons, plungers, switches, or other moving actuators. In other embodiments, the sensors 102-105 are proximity sensors such as those that use capacitive, magnetic, inductive, hall effect, or another field, transmission or beam to sense a target. The sensors 102-105 are coupled with the controller 82, which is also coupled with the propulsion system 50, and in this example, specifically with the motor 76. As such, the controller 82 also provides motor control functions. In some embodiments, the controller 82 monitors the selected gear, and following a shift, provides information on the selected gear, such as the currently operating gear, to the propulsion system 50. A sensor, such as a variable resistor that changes electrical resistance depending on the position of the shift cable or its pulley, may be used to provide a signal representative of the currently selected gear.

Figure 3:
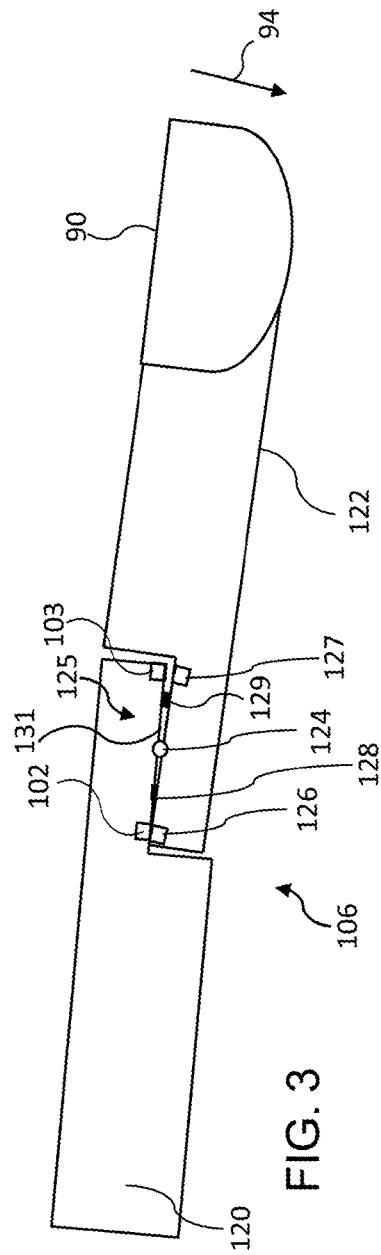
FIG. 3 is a fragmentary, schematic illustration of a shift lever of the shifter system of FIG. 2, in accordance with various embodiments.

The levers 90, 92 of the shifter 84 include joints 106, 108, respectively. The joint 106 is disposed in the lever 90 between the end 110, which is connected with the shifter body 88 and its opposite input end 112. Similarly, the joint 108 is disposed in the lever 92 between the end 114, which is connected with the body 88 and its opposite input end 116. With additional reference to FIG. 3, the joint 106 is illustrated in a detail view, shown in a position resulting from an initial input. The joint 108 is identical in function, and similar or identical in structure to the joint 106. The joint 106 is formed by separation of the lever 90 into two sections 120, 122 that are capable of moving relative to one another. The sections 120, 122 are connected to pivot relative to one another at a hinge 124 with a lash mechanism 125 that in response to input 94, allows an initial movement of the section 122 prior to movement of the section 120. In this embodiment the hinge 124 is a pivot formed by a pin connecting the sections 120, 122 as two separate pieces connected together. In other embodiments, the hinge 124 is an integral part of the sections 120, 124, such as a flexible strip, that allows the sections 120, 124 to pivot relative to each other. Referring additionally to FIG. 3, in this embodiment, the sensors 102, 103 are disposed on the section 120 and the section 122 includes contacts 126, 127 that interact with the sensors 102, 103. In other embodiments, such as those with a proximity sensor as the sensor 102, the contacts 126, 127 are replaced with targets for the sensors 102, 103, which in some embodiments are an integral part of the section 122 itself. The joint 106 includes springs 128, 129 in a space 131 as a part of a lash mechanism 125. The spring 128 biases the sections 120, 122 to locate so that the contact 126 is normally spaced apart from the sensor 102, and the spring 129 biases the sections 120, 122 to locate so that the contact 127 is normally spaced apart from the sensor 103, in a balanced unactuated state as in the position of FIG. 2. When the input 94 is applied to the lever 90, in this example in a clockwise direction as viewed in FIG. 3, prior to movement of the section 120 and the cable 86, the section 122 pivots on the hinge 124 relative to the section 120 due to the lash mechanism 125. This brings together the sensor 102 and the contact 126 as in the position of FIG. 3, resulting in a signal to the controller 82. In response, the controller 82 interrupts current to the motor 76, which stops generating torque, relieving tension on the chain 68. The spring 128 is configured with a spring rate or the lash mechanism 125 is provided with stops, in this embodiment due to the shapes of the lever sections 120, 122, such that further application of the input 94 on the lever 90 as a shift input, rotates the section 120 along with the section 122. The cable 86 is then moved through the shifter 84 to trigger the variable ratio transmission system 78 to shift gears. As a result, tension is relived prior to initiation of the gear change. After the shifting is complete and the lever 90 is released for return to its original position, and the controller 82 resumes normal operation of the motor 76. In this embodiment, the sensor 103, contact 127 and spring 129 operate similarly when the input 94 is applied in a counter-clockwise direction as viewed in FIG. 3. To effect downshifts, the lever 92 functions in the same way the lever 90 functions during upshifts, including relieving tension prior to initiation of a gear shift.

Figure 4:
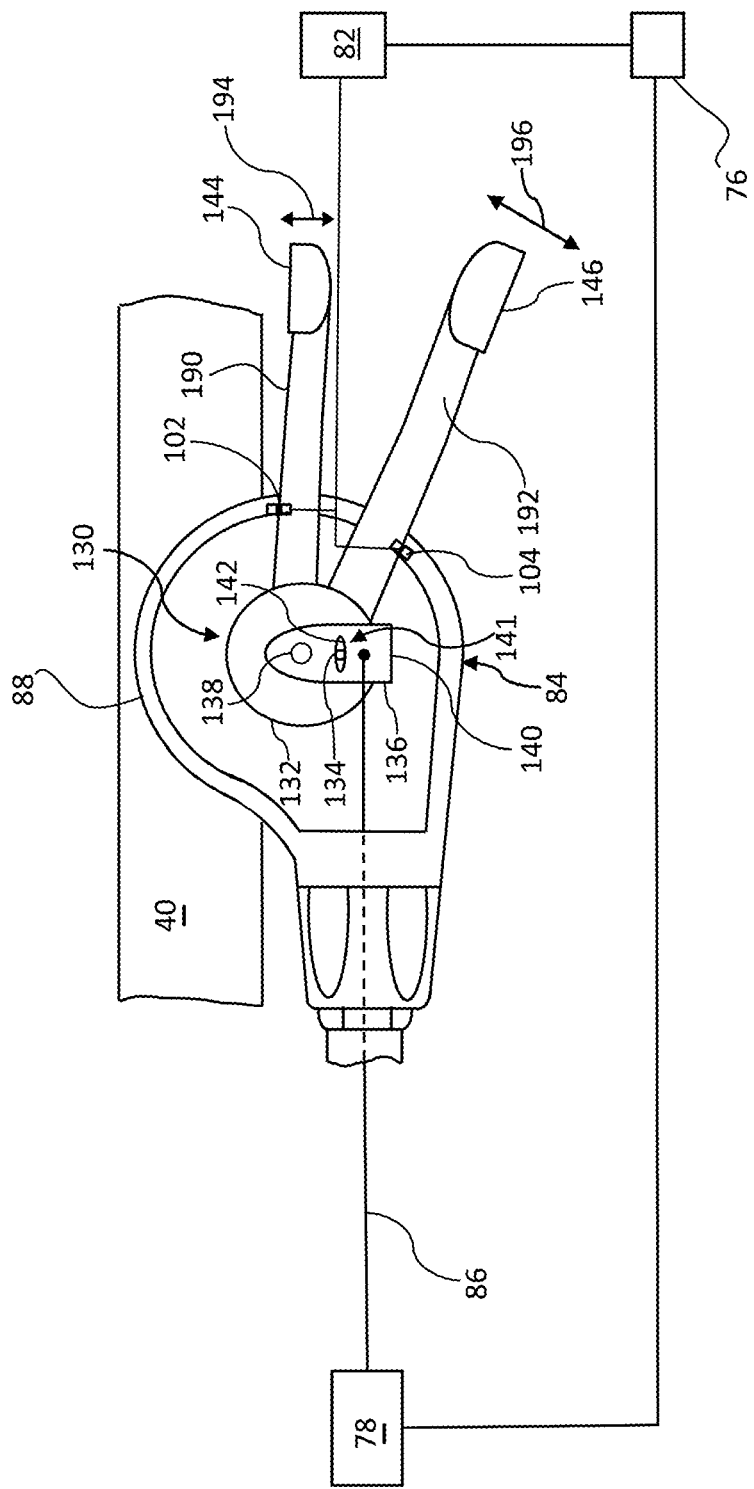
FIG. 4 is a schematic illustration of a shifter system for use with the bicycle of FIG. 1, in accordance with other embodiments.

Referring to FIG. 4, in another embodiment of the disclosed cycle shifter system with integrated sensor, the shifter 85 is again mounted on the handlebars 40 and is coupled with the variable ratio transmission system 78 through the cable 86. As shown in FIG. 4, the shifter 85 has its cover removed from the body 88 to show internal components of its core 130. Levers 190, 192 are connected with the core 130 to effect movement of the cable 86 for upshifts and downshifts respectively. In this embodiment the levers are solid for their entire length. Inputs 194, 196 on the levers 90, 92 respectively, are immediately transmitted to the core 130. In this embodiment the inputs 194, 196 may be applied in either direction to effect an upshift, in the case of lever 190, or a downshift, in the case of lever 192. In other embodiments, the levers may operate in responses to inputs in only one direction. Sensors 102, 104 are positioned to sense relative motion, in either direction, between the levers 190, 192 and a fixed point such as on the body 88. Again, the sensors 102, 104 are contact sensors, proximity sensors or any sensors that are capable of detecting relative movement between the levers 190, 192 and the body 88, in this example, in either direction. The sensors 102, 104 are coupled with the controller 82, which is coupled with the motor 76. The motor 76 provides torque input to the variable ratio transmission system 78. In other embodiments, the sensors 102, 104 are positioned to detect movement of another component, such as of the core 130 relative to the body 88, prior to movement of the cable 86.

Figure 5:
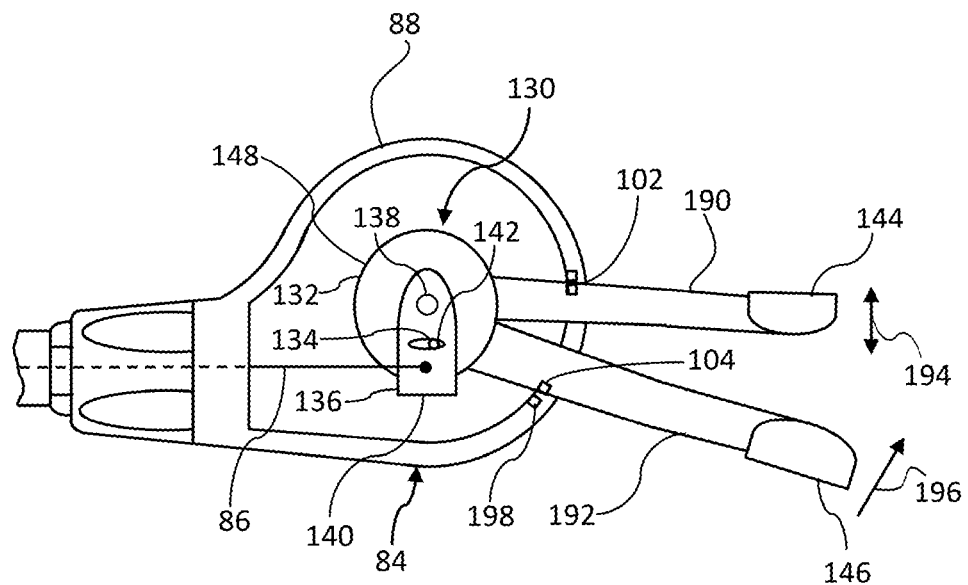
FIG. 5 is a schematic illustration of a part of the shifter system of FIG. 4, in a position resulting from an initial input.
Figure 6:
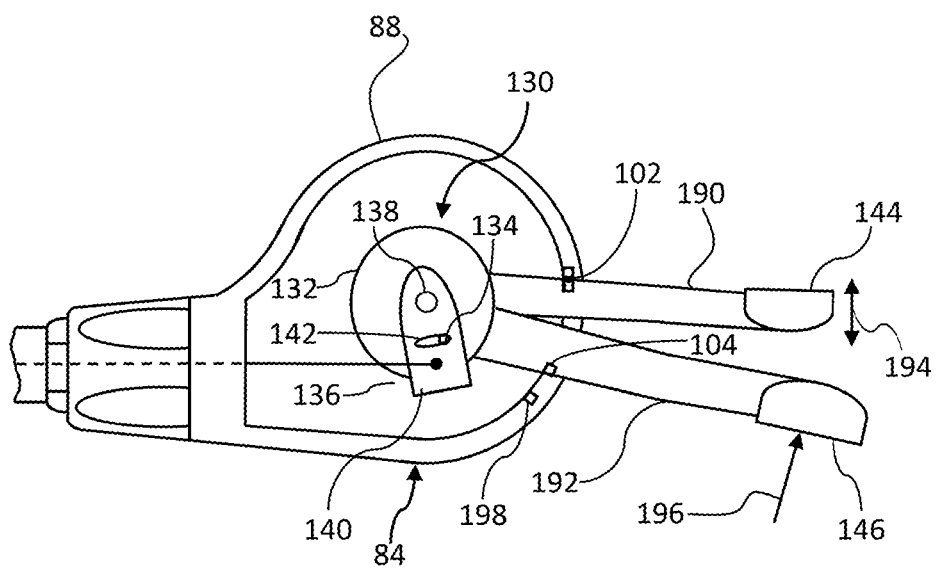
FIG. 6 is a schematic illustration of a part of the shifter system of FIG. 4, in a position resulting from a shift input.

The core 130 includes a mechanism with a cable pulley 132 that transfers pivoting movement of the levers 190, 192 to bi-directional movement of a pin 134. The core 130 also includes an arm 136 that rotates about a center 138 of the core 130. The arm 136 extends from the center 138 radially to an end 140. The cable 86 is attached to the arm 136 near the end 140 so that rotation of the arm 136 results in movement of the cable 86, which is transferred to the variable ratio transmission system 78. The arm 136 has a lash mechanism 141 with an aperture 142 through which the pin 134 extends. For example, initial input 196, in this example in a counter-clockwise direction as viewed, on the lever 192 results in its rotation and movement of the pin 134 within the aperture 142 without movement of the arm 136 or of the cable 86. In effect, the lash mechanism 141 offsets the initial input on the levers 190, 192 so that the cable pulley 132 remains stationary. As shown in FIG. 5, the initial movement separates the sensor 104 from its contact/target 198, resulting in a signal to the controller 82. In response, the controller 82 interrupts current to the motor 76, which stops generating torque, relieving tension on the chain 68. After the initial movement anticipating a gear shift and triggering a cessation of torque, further movement of the lever 190 in response to shift input 196 results in driving the pin 134 against an end of the lash mechanism's aperture 142 rotating the arm 136 as shown in FIG. 6. The cable 86 is then moved through the shifter 84 to trigger the variable ratio transmission system 78 to shift gears. As a result, tension is relived prior to initiation of the gear change. To effect upshifts, the lever 190 functions in the same way the lever 192 functions during downshifts, including relieving tension prior to initiation of a gear shift. In some embodiments, the sensors 102, 104 are pressure sensors and are located at the finger pads 144, 146. Initial pressure on the pads 135, 137 is used to interrupt torque output from the motor 76, prior to initiation of a shift.

Figure 7:
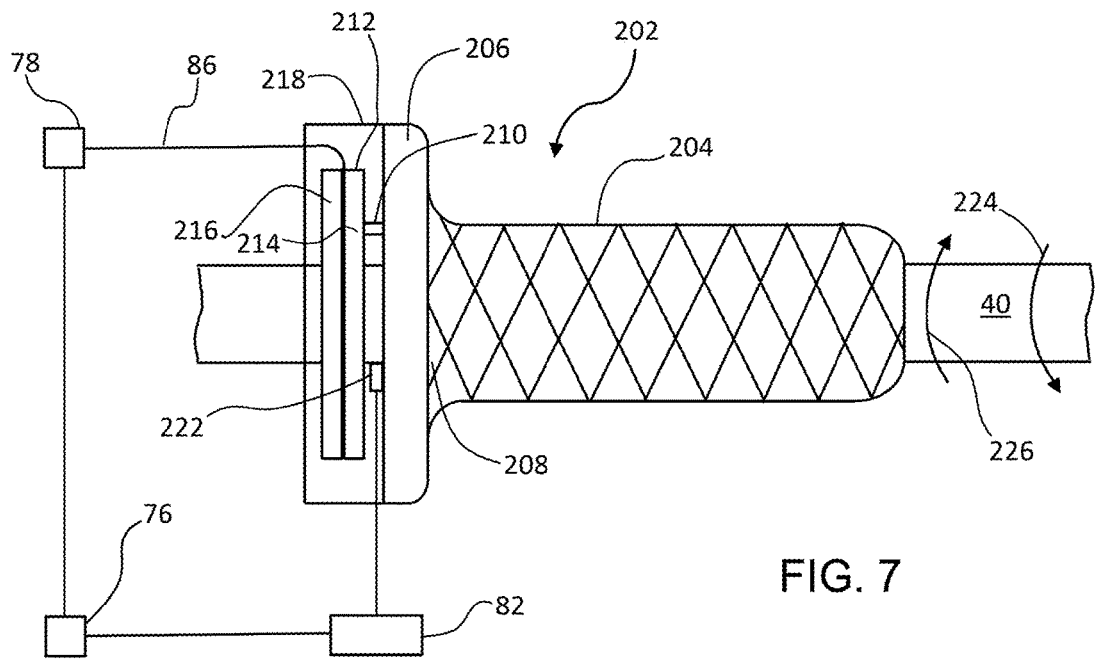
FIG. 7 is a schematic illustration of a shifter system for use with the bicycle of FIG. 1, in accordance with additional embodiments.
Figure 8:
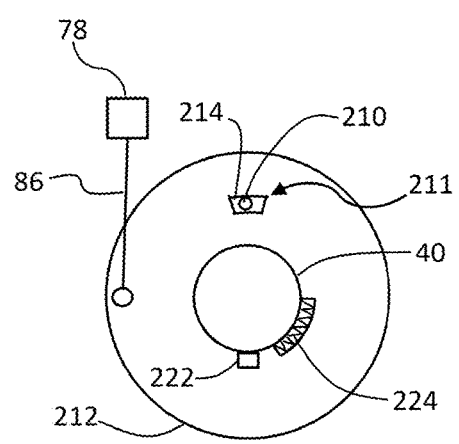
FIG. 8 is an internal view of the cable pulley area of the shifter system of FIG. 7.

Another embodiment of the disclosed cycle shifter system with integrated sensor is disclosed in FIGS. 7 and 8 in a twist grip type mechanism. The shifter 202 includes a grip lever 204 made of a resilient material with the handlebar 40 extending through its open center so that the grip lever 204 is rotatable on the handlebar 40. The grip lever 204 includes an integral flange 206 that extends radially outward at one end 208. A pin 210 extends from the flange 206 parallel to the handlebar 40 and in a direction away from the grip lever 204, projecting outward. The pin 210 is spaced radially outward from the handlebar 40. A cable pulley 212 is received over the handlebar 40 and is spaced away from the flange 206. The cable 86 couples the cable pulley 212 with the variable ratio transmission system 78. The cable pulley 212 includes a lash mechanism 211 with an aperture 214 into which the pin 210 extends. Next to the cable pulley 212, an indexing mechanism 216 is disposed around the handlebar 40 in a common housing 218 with the cable pulley 212. The indexing mechanism 216 serves a ratcheting function to step between gears during shifts and to locate the cable 86 at definitive positions for each gear. A sensor 222 is fixed in position, such as on the handlebar 40 and is located adjacent the cable pulley to sense movement thereof. A spring 224 maintains a small tension on the cable 86 and returns the cable pulley 212 to its home position.

Upshifting is initiated by rotation input 226 of the grip lever 204. Movement of the grip lever 204 moves the pin 210 within the aperture 214, initially without movement of the cable pulley 212. The sensor 222 identifies the initial movement of the grip lever 204 relative to the handlebar 40, prior to movement of the cable pulley 212 or the cable 86, resulting in a signal identified by the controller 82. In response, the controller 82 interrupts current to the motor 76, which stops generating torque, relieving tension on the chain 68. After the initial movement anticipating a gear shift and triggering a cessation of torque, further rotation of the grip lever 204 results in driving the pin 210 against an end of the aperture 214 rotating the cable pulley 212. The cable 86 is then moved with rotation of the cable pulley 212 to trigger the variable ratio transmission system 78 to shift gears. To effect downshifts, the grip lever 204 functions in the same way when rotated in the opposite direction 226 to relieve tension prior to initiation of a gear shift.

Through the above described cycle shifter systems with integrated sensors, gear shifts are carried out after torque output from a propulsion system's motor is suspended or interrupted. The sensors detect initial movement of the up/down shifter levers, or initial pressure applied to the lever surface. The sensors signal the motor controller prior to the physical gear shifting occurs, giving time to the mechatronic system to react and accommodate the gear shifting. After the shifting is complete and the lever is returned to its original position, and the controller resumes normal motor operation.

It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A shifter system for a cycle comprising:
a power unit configured to deliver a torque to propel the cycle;
a variable ratio transmission system coupled with the power unit;
a coupling element configured to transmit movement to shift the variable ratio transmission;
a pulley coupled with the coupling element and configured to rotate to move the coupling element;
a lever coupled with the pulley and configured to impart rotation to the pulley;
a sensor positioned to detect an initial input on the lever, wherein the lever and the pulley are configured so that the initial input is detected by the sensor does not rotate the pulley; and
a controller, configured to interrupt the torque from the power unit in response to the initial input and prior to the transmission of movement by the coupling element.

2. The system of claim 1, comprising a lash mechanism configured to offset the initial movement of the lever in response to the initial input as the pulley remains stationary, and configured so that further movement of the lever beyond the initial movement moves the pulley to shift the variable ratio transmission system through the coupling element.

3. The system of claim 2, wherein the lash mechanism includes a pin, and wherein the pulley defines an aperture into which the pin extends, the lash mechanism configured so that the pin moves in the aperture in response to the initial movement.

4. The system of claim 2, wherein the lever includes a first section and a second section, and comprising a hinge connecting the first and second sections, wherein the sensor is positioned on the lever and is configured to detect rotation of the second section about the hinge.

5. The system of claim 4, wherein the first and second sections define a space, and comprising a spring positioned in the space between the first and second sections, the spring configured to compress in response to the initial input.

6. The system of claim 5, wherein the spring has a spring rate configured so that the first section does not move when the spring is compressed in response to the initial input.

7. The system of claim 1, comprising:
an arm positioned adjacent the pulley, wherein the pulley is coupled with the coupling element through the arm, and wherein the arm defines an aperture; and
a pin extending from the pulley and into the aperture;
wherein the pin and aperture are configured to provide lash between the lever and the coupling element so that the initial input does not move the coupling element.

8. The system of claim 7, wherein the coupling element is connected to the arm.

9. The system of claim 7, comprising a housing within which the pulley and the arm are disposed, wherein the sensor is configured to detect movement between the lever and the housing.

10. A shifter system for a cycle comprising:
a motor configured to deliver a torque;
a variable ratio transmission system configured to receive the torque and configured to shift between various gear ratios;
a shifter configured to trigger the variable ratio transmission system to shift;
a cable extending from the shifter to the variable ratio transmission system, and configured to move in response to the shifter to shift the variable ratio transmission system;
a lever connected in the shifter, the lever configured to move the cable in response to a shift input;
a sensor configured to detect an initial input on the lever, wherein the lever and the cable are configured so that initial input is insufficient to move the cable; and
a controller, configured to interrupt the torque from the motor in response to the initial input and prior to movement of the cable.

11. The system of claim 10, comprising:
a cable pulley disposed in the shifter and connected with the cable, the cable pulley configured to move the cable in response to the shift input;
a lash mechanism configured so that an initial movement of the lever in response to the initial input does not rotate the cable pulley and configured so that further movement of the lever beyond the initial movement and in response to the shift input moves the cable pulley to shift the variable ratio transmission system through the cable.

12. The system of claim 11, wherein the lash mechanism includes a pin, and wherein the cable pulley defines an aperture into which the pin extends, the lash mechanism configured so that the pin moves in the aperture in response to the initial movement.

13. The system of claim 11, wherein the lever includes a first section and a second section, and comprising a hinge connecting the first and second sections, wherein the sensor is positioned on the lever and is configured to detect rotation of the second section about the hinge.

14. The system of claim 13, wherein the first and second sections define a space, and comprising a spring positioned in the space and between the first and second sections, the spring configured to compress in response to the initial input.

15. The system of claim 14, wherein the spring has a spring rate configured so that the first section does not move when the spring is compressed in response to the initial input.

16. The system of claim 10, comprising:
a cable pulley disposed in the shifter and connected with the cable;
an arm disposed in the shifter, wherein the arm defines an aperture; and
a pin extending from the cable pulley and into the aperture;
wherein the pin and aperture are configured to provide lash between the lever and the cable so that the initial input does not move the cable.

17. The system of claim 10 comprising:
a second lever connected in the shifter, the second lever configured to move the cable; and
a second sensor configured to detect an input on the second lever;
wherein the controller is configured to interrupt the torque from the motor in response to the input on the second lever.

18. The system of claim 10, comprising a crankshaft coupled with the variable ratio transmission system, the crankshaft configured to respond to manual pedal inputs to propel the cycle.

19. The system of claim 10, wherein the lever comprises a grip configured to twist to provide the initial input and the shift input.

20. A shifter system for a cycle comprising:
a propulsion system including a motor configured to deliver a torque to propel the cycle and a variable ratio transmission system coupled with the motor;
a crankshaft with pedals connected in the propulsion system and configured to propel the cycle by manual inputs on the pedals;
a shifter disposed on the cycle;
a cable connecting the shifter with the variable ratio transmission system, the cable configured to transmit movement from the shifter to initiate a shift of the variable ratio transmission system;
a cable pulley disposed in the shifter, coupled with the cable, and configured to rotate to move the cable;
a lever connected in the shifter, coupled with the cable pulley, and configured to impart rotation to the cable pulley;
a sensor positioned to detect an initial movement of the lever, wherein the initial movement is detectable by the sensor but does not rotate the cable pulley; and
a controller, configured to:
interrupt the torque from the motor in response to the initial movement and prior to the shift; and
monitor the selected gear and provide information on the selected gear to the propulsion system.

\* \* \* \* \*